United States Patent [19]

Parker et al.

[11] Patent Number: 5,538,116
[45] Date of Patent: Jul. 23, 1996

[54] BRAKE ASSEMBLY FOR BLIND CABLE INSTALLATION

[75] Inventors: Donald L. Parker, Middletown; Brad N. Venetos; William A. Fetty, both of Dayton, all of Ohio

[73] Assignee: General Motors Corporation, Detroit, Mich.

[21] Appl. No.: 509,375

[22] Filed: Jul. 31, 1995

[51] Int. Cl.⁶ .................................................. A16D 51/00
[52] U.S. Cl. ........................... 188/331; 188/2 D; 74/502.6
[58] Field of Search ................................ 188/2 D, 78, 79, 188/325, 328, 106 A, 331; 74/502.6

[56] References Cited

U.S. PATENT DOCUMENTS

| | | | |
|---|---|---|---|
| 2,140,385 | 12/1938 | Hunt et al. | 188/325 X |
| 2,209,772 | 7/1940 | Goepfrich et al. | 188/331 |
| 2,215,747 | 9/1940 | White et al. | 188/331 X |
| 3,064,767 | 11/1962 | Wieger | 188/78 |
| 4,753,325 | 6/1988 | Jaksic | 188/2 D |
| 4,886,134 | 12/1989 | Yamamoto | 188/20 |
| 4,886,146 | 12/1989 | Copp | 188/2 D |
| 4,930,605 | 6/1990 | Boyer et al. | 188/2 D |
| 4,932,503 | 6/1990 | Yamamoto | 188/2 D |
| 5,377,789 | 1/1995 | Brooks, Sr. et al. | 188/20 |

*Primary Examiner*—Robert J. Oberleitner
*Assistant Examiner*—Peter M. Poon
*Attorney, Agent, or Firm*—Jeffrey A. Sedlar

[57] ABSTRACT

A brake assembly includes a guide spring for returning a parking brake actuator arm to a release position and which serves to guide an apply cable into engagement with the actuator arm during assembly. The guide spring is inhibited from deflecting during insertion of the cable by a retaining spring that spans across the opposing lower brake shoe ends at the adjuster link and which includes an extending tail positioned adjacent the guide spring.

4 Claims, 1 Drawing Sheet

5,538,116

BRAKE ASSEMBLY FOR BLIND CABLE INSTALLATION

BACKGROUND OF THE INVENTION

The present invention relates to vehicle brakes and more particularly, to a cable actuated drum type parking brake adapted to a blind cable assembly.

Blind assembly of a parking brake cable into an assembled brake subsystem is conventionally known. An example of such an assembly is disclosed in U.S. Pat. No. 5,377,789 entitled "Snap-In Park Brake Cable" which issued Jan. 3, 1995 and is commonly assigned. This type of brake construction permits assembling the cable to an actuator lever carried within the brake assembly while the brake drum is in place. The cable is inserted through the return spring for the actuator lever which serves to guide the cable end into position and into engagement with the actuator lever.

With this type of brake assembly, the return spring must adequately guide the cable into position. Should the cable end miss its intended target, the assembly will not be completed and additional effort would be required to complete the assembly.

SUMMARY OF THE INVENTION

It has been discovered that a brake design adapted for blind cable installation may require a cable guide spring of such a length or configuration that a tendency for the guide spring to yield is created when the parking brake cable is inserted therethrough for attachment to the actuator lever during assembly. Particularly when the brake assembly is configured such that the cable guide spring is lengthy, the amount of yielding experienced may become significant enough to cause the cable to miss its intended target on the actuator lever. Accordingly, when such a condition could exist, the present invention provides a solution by preventing the cable guide spring from yielding excessively.

A brake assembly according to an aspect of the present invention includes generally two but at least one brake shoe presenting a first brake shoe end and a second brake shoe end. A guide spring including a coiled section is positioned in the brake assembly near one of the brake shoe ends and generally engages an actuator lever that is connected to the brake shoe somewhat away from the end. A retaining spring extends between and engages the brake shoe ends preferably by hooking into openings in the brake shoe ends. A tail extends from the retaining spring on the end that engages the brake shoe end near the guide spring. The tail extends for a specified length, at least to a position adjacent the coiled section of the guide spring and is capable of inhibiting deflection of the guide spring.

The tail of the retaining spring is positioned such that during insertion of the cable, the most susceptible yielding movement of the cable guide spring is inhibited by engagement with the tail. The specific shape and position of the tail is determined according to the needs of the individual application. According to one embodiment of the present invention described herein, the tail is positioned such that it extends under the cable guide spring substantially near a downwardly directed bend between the guide spring's midpoint and its point of engagement with the actuator lever.

DESCRIPTION OF THE PREFERRED EMBODIMENT

Figure 1:
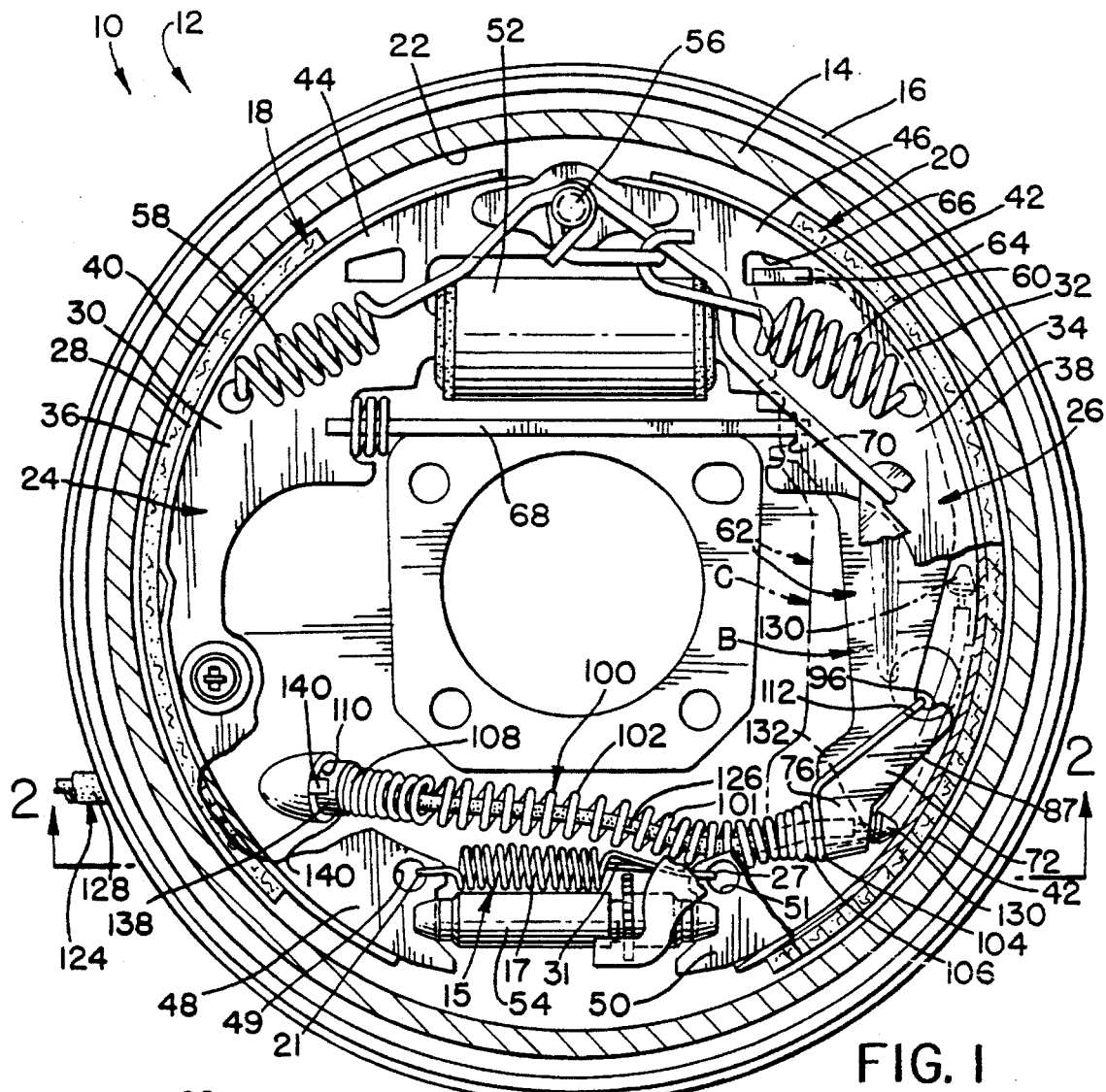
FIG. 1 is a partially sectioned side view of a drum brake mechanism as it would be viewed from the outboard direction.

FIG. 1 shows a drum parking brake mechanism 10 integral with a drum service brake mechanism 12. The parking and service brake mechanisms 10 and 12 are enclosed by a drum 14 and a backing plate 16.

The backing plate 16 is adapted to be fixed to a nonrotating element such as a flange on an end of an axle (not illustrated). First and second brake shoe assemblies 18 and 20 are mounted to the backing plate 16 for selective movement into and out of engagement with a drum friction surface 22 for brake actuation and release.

The shoe assemblies 18 and 20 respectively include first and second shoes 24 and 26. First brake shoe 24 includes a first rim 28 and a first web 30. Second brake shoe 26 includes a second rim 32 and a second web 34. The first shoe assembly 18 has a first brake lining 36 secured to the first rim 28. The second brake shoe assembly 20 has a second brake lining 38 secured to the second rim 32. The outer surfaces of the brake linings 36 and 38 provide first and second lining friction surfaces 40 and 42 which mate with the drum friction surface 22 during brake actuation. The shoes 24 and 26 respectively have upper shoe ends 44 and 46 and lower shoe ends 48 and 50. The upper shoe ends 44 and 46 are arranged to be operatively engaged by a wheel cylinder 52 so that the shoe assemblies 18 and 20 may be hydraulically actuated for service brake operation.

As is well known in the art, a suitable service brake operator, such as a master cylinder (not shown), provides hydraulic brake fluid under pressure to the wheel cylinder 52 to expand the cylinder 52 and move the upper shoe ends 44 and 46 apart so that the lining 36 and 38 are moved into braking engagement with the drum friction surface 22. In the service brake mechanism 12 illustrated, the brake shoe assemblies 18 and 20 are arranged in a duo-servo manner. An adjustable link 54 between the lower shoe ends 48 and 50 transfers torque from the first shoe assembly 18 to the second shoe assembly 20. Torque from the brake shoe assemblies 18 and 20 is then transferred to an anchor pin 56 and finally to the backing plate 16.

The service brake mechanism 12 may also be of other well known types such as the leading-trailing, leading-leading and trailing-trailing. First and second brake shoe return springs 58 and 60 are connected to the corresponding brake shoes 24 and 26 near the wheel cylinder 52 so as to continually urge the upper shoe ends 44 and 46 toward a release position seen in FIG. 1. This arrangement is also well known in the art.

The parking brake mechanism 10 has an associated parking brake actuating lever 62, best seen in FIG. 1, with an upper end 64 pivotally mounted on the web 34 of the second brake shoe 26 for selectively pivoting between an apply position C and a release position B. The second web 34 is provided with an aperture 66 through which the lever's upper end 64, bent so as to extend through the aperture 66, extends to provide a pivoting attachment. A strut 68 disposed between the two shoe assemblies 18 and 20 near their upper ends 44 and 46 extends into a recess 70 in the lever 62.

The parking brake mechanism 10 is actuated by pulling on a lower end 72 of the lever 62 to pivot the lever 62 to the apply position C. This causes the strut 68 to be pressed against the first shoe assembly 18 with the first lining friction surface 40 engaging the drum friction surface 22.

Figure 2:
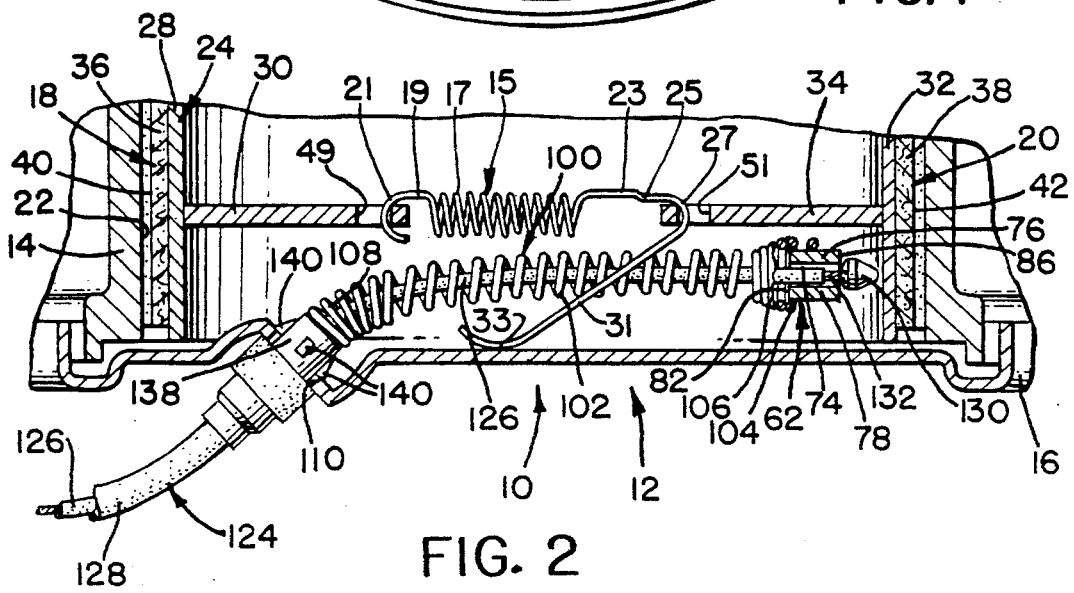
FIG. 2 is a sectional view of the drum brake mechanism taken generally through the plane indicated by the line 2—2 in FIG. 1.

A lever return spring 100, shown in FIGS. 1 and 2, is disposed between the lever 62 and the backing plate 16. A helical coiled section 102 of the return spring 100 has an end coil 104 at a first end 106 disposed on the spring seat 78 thereby engaging the lever 62 at the first end 82 of the channel 74. A second end 108 of the helical coiled section 102 of the spring extends through an opening 110 in the backing plate 16 before assembly is completed.

To install the cable assembly 124 in the parking brake mechanism 10, the first end 132 of the cable 126 is inserted into the second end 108 of the helical coiled section 102 of the spring 100 which extends through the opening 110 in the backing plate 16. The helical coiled section 102 of the spring 100 guides the first end 132 of the cable 126 to the lever 62 as it is fed into the enclosed parking brake mechanism 10. As the cable 126 is inserted, the button 130 travels freely through the helical coiled section 102 to a point where the button 130 exits the end coil 104. At approximately this point, the button 130 comes into contact with the lever 62 and the button 130 engages end 86 securing the cable 126 in channel 74.

After confirming engagement of the button 130 with the second end 86 of the channel 74, the conduit 128 is pressed toward the spring 100. The bayonet 138 at the end of the conduit 128 contacts the second end 108 of the helical coiled section 102 of the spring 100, compressing the spring 100 as the bayonet 138 is moved into the opening 110 in backing plate 16. The barb-like tabs 140 engage the backing plate 16 when the bayonet 138 is fully inserted. This leaves the helical coiled section 102 of spring 100 functionally compressed between lever 62 and backing plate 16, which tends to move the lever 62 to the release position B. A more detailed description of a blind cable assembly is found in U.S. Pat. No. 5,377,789 entitled "Snap-In Park Brake Cable" which issued Jan. 3, 1995 and is specifically incorporated herein by reference.

As shown in FIGS. 1 and 2, the retaining spring 15 extends between the lower shoe ends 48 and 50 in the vicinity of the adjustable link 54. The retaining spring 15 is, in general, a helical spring of substantially constant diameter wire wound tight in the coiled section 17 to expand under axial tension. Retaining spring 15 includes a stem 19 extending from the coiled section 17 and which terminates in a hook 21. Hook 21 is sufficiently curved for securely hooking within opening 49 of brake shoe end 48.

Retaining spring 15 also includes a stem 23 which has an offset 25 to accommodate the hook 27 which is sufficiently curved for extending through opening 51 of brake shoe end 50 but which has a tighter radius of curvature than hook 21. The extent of curvature of both hooks, 21 and 27 is within the range of being beyond normal, as to the respective stems 19, 23 to curving completely backward in the direction of coiled section 17. The length inside the hooks 21 and 27 is sufficiently sized for placing the coiled section in tensile expansion when positioned between the brake shoe ends 48 and 50 as separated by the adjustable link 54.

The hook 27, of retaining spring 15, passes through the opening 51 of the brake shoe end 50 and a tail 31 extends from the hook 27. The tail 31 is sufficiently long to pass through a position adjacent the guide spring 100 and provides support therefor when the cable 126 is extended through the guide spring 100. As best shown in FIG. 2, the tail 31 extends from the hook 27 to the backing plate 16. The tail 31 passes under guide spring 100 in an area near the downward bend 101 and bend 33 engages the backing plate 16 being self biasing thereagainst.

When the cable 126 is inserted through the guide spring 100 any tendency to deflect downwardly is inhibited by the tail 31 which extends substantially directly underneath the guide spring 100. Optionally, the tail 31 does not engage the backing plate 16 but extends a sufficient length from opening 51 to provide support for guide spring 100. The specific shape and length of the tail 31 is dependent upon the needs of the specific application. As can be seen from FIG. 2, applications may exist where it would be beneficial to reverse the direction of hook 21 and include a tail which extends therefrom, past guide spring 100.

By means of the present invention, a retaining spring is provided for a brake assembly such that a structure exists for assisting the parking brake cable in reaching its intended target on the initial attempt while utilizing blind assembly techniques.

What is claimed is:

1. A brake assembly comprising:

first brake shoe end and a second brake shoe end;

a guide spring carried in the brake assembly including a coiled section that is positioned near the second brake shoe end; and a retaining spring extending between and engaging the first and second brake shoe ends having a tail extending to a position adjacent the coiled section of the guide spring, the tail being capable of inhibiting deflection of the guide spring.

2. A brake assembly comprising:

a backing plate having a cable opening therein;

a first brake shoe carried near the backing plate and having a first end with a first opening therein;

a second brake shoe carried near the backing plate and having a second end with a second opening therein;

a guide spring extending from a point near the cable opening substantially across the backing plate and passing near the second opening in the second brake shoe; and a retaining spring having a first hook engaging the first opening and a second hook passing through the second opening there being a tail extending from the second hook sufficiently long to pass from the second brake shoe end to the guide spring wherein the tail is capable of inhibiting deflection of the guide spring.

3. A brake assembly according to claim 2, wherein the tail engages the backing plate and is self biasing thereagainst.

4. A brake assembly comprising:

a brake shoe having an opening;

an actuator arm pivotably engaging the brake shoe;

a guide spring bearing against the actuator arm;

a cable extendible through the guide spring and engageable with the actuator arm; and a retaining spring engaging the brake shoe including a coiled section from which a stem extends wherein the stem includes a hook passing through the opening of the brake shoe, there being a tail extending from the hook sufficiently long to pass through a position adjacent the guide spring and provide support therefor when the cable is extended through the guide spring.

* * * * *